Figure 1:
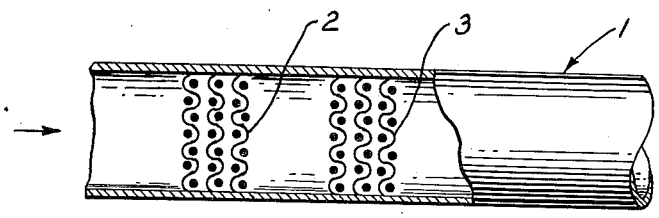
Figure 2:
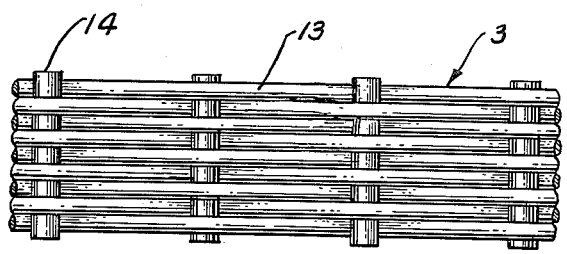
Figure 3:
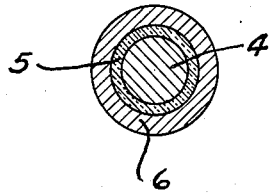
Figure 4:
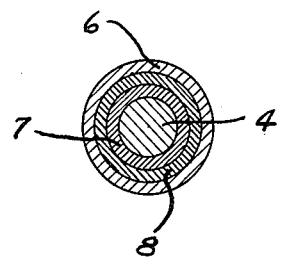

Jan. 10, 1956

H. HOLZMANN 2,730,189

PLATINUM RECOVERY

Filed Feb. 2, 1951

INVENTOR

HERMANN HOLZMANN

BY Bailey, Stephens & Huettig

ATTORNEYS

United States Patent Office 2,730,189
Patented Jan. 10, 1956

2,730,189

PLATINUM RECOVERY

Hermann Holzmann, Hanau (Main), Germany, assignor to The Deutsche Gold- und Silber-Scheideanstalt vormals Roessler, Frankfurt am Main, Germany, a corporation of Germany Application February 2, 1951, Serial No. 208,998

Claims priority, application Germany February 9, 1950

10 Claims. (Cl. 183—1)

The present invention relates to improvements in the recovery of platinum lost from platinum containing catalysts during use in high temperature catalytic reactions.

The principal object is to provide a novel manner for the recovery of platinum which is lost from platinum catalysts in high temperature catalytic reactions.

In catalytic reactions carried out with platinum catalysts, such as, for example, in the oxidation of ammonia to nitrogen oxides carried out at temperatures of about 800° C., substantial quantities of platinum are lost from the catalyst, namely, about 0.3 gram of platinum per ton of reacted nitrogen. Evidently these losses are to some degree caused by strong disintegration of the platinum structure resulting from the formation of platinum black.

It has been possible in the past to recover a small portion of the platinum catalyst by inserting a mechanically acting filter such as quartz wool, glass wool or metal wool behind the catalyst proper. The platinum recovered is evidently only that which is in the form of solid platinum particles. Aside from the low recovery of the platinum lost from the catalyst, the mechanical filters have the disadvantage that they cause a considerable drop in pressure which causes a decrease in the quantity of ammonia reacted.

It has also been proposed to make use of the ability of gold to trap platinum particles which impinge upon it at elevated temperatures by a welding action at the point of contact. In practice, filling bodies such as porcelain rings (so-called Raschig rings) provided with a thin coating of gold have been placed in a thick layer immediately behind the catalyst. It was possible to recover up to 70% of the platinum lost with such gold coated filling bodies without causing disturbing drops in pressure. Both the mechanical filters as well as the gold coated bodies have the disadvantage that substantial quantities thereof must be employed in a thick layer.

In accordance with the invention, it was unexpectedly discovered that fine meshed nettings and especially metal wire nettings placed behind the catalyst at a point where the temperature is still sufficiently high has an excellent collecting action for the platinum lost from the catalyst despite the fact that their cross-section in the direction of the gas flow is extremely small. Such nettings are practically two dimensional structures. Despite the fine meshed character of such nettings, they primarily operate as entrapping or collecting surfaces rather than mechanical filters. It is most surprising that a non-mechanical acting filter whose cross-section in the direction of gas flow is only a fraction of a millimeter would serve to recover the substantial quantities of the platinum lost from the catalyst as has been discovered in accordance with the invention.

The thickness of the wire, type of weave as well as the number of meshes per cm.² and especially the ratio of the total area of the openings in the netting to the total area of the netting have considerable influence upon the collecting action of the netting. Of equal importance is the composition of the material from which the netting is produced, especially, the chemical nature of the surface of the wires.

The use of the fine meshed nettings in accordance with the invention renders it possible to recover up to 85% of the platinum lost from the catalyst in comparison to the relatively low recovery possible with mechanical filters and the 70% recoverable with gold plated Raschig rings.

A further advantage of the use of the nettings in accordance with the invention is the relatively low weight of the nettings in comparison with the weights of the previously employed recovery means. For example, for a catalyst element of platinum netting of 2,000 mm. diameter about 500 kg. of Raschig rings are required in comparison with 15 kg. of the nettings which are required in accordance with the invention.

In accordance with the invention, it has been found that a galloon weave is especially advantageous for the netting. A galloon weave in which the weft wires are tightly packed next to each other possesses a substantially 100% baffle action as no free spaces are present in a direction at a right angle to the plane of the netting. Galloon weaves and other weaves which leave no spaces between the wires when viewed at right angle to the plane of the netting are, therefore, preferable over simple cross weaves. For galloon weaves wires of a cross-section between 0.2 and 0.4 mm. are preferred for the warp and between 0.1 and 0.2 are preferred for the weft. Especially advantageous results have been obtained with a gallon weave netting whose warp wires are 0.25 mm. and whose weft wires are 0.16 mm. in cross-section. As indicated above, the weft wires are preferably closely packed. Naturally the warp wires must be spaced at least to permit passage of the weft wires therebetween. A spacing of 1–2 mm. between the warp wires has been found advantageous. It has been found that the shape of the cross-section of the wires does not materially influence the results obtained.

The material from which the nettings are produced as has already been indicated, is of special significance with reference to the collecting action thereof. The following results which were obtained in comparative tests with nettings composed of scaling and heat resistant base metal wires (heat and scaling resistant Ni-Cr alloy) on one hand and on the other hand, nettings of the same alloy but provided with a gold coating.

|  | Test I | Test II |
| --- | --- | --- |
| Length of Test | 90 days | 90 days. |
| Weave | galloon weave; warp .25 mm., weft .16 mm. | galloon weave; warp 25 mm., weft .16 mm. |
| Wires consisting of | Ni-Cr alloy | Ni-Cr alloy coated with gold about 3 mm. thick. |
| No. of nettings employed in series. | 3 | 3. |
| Percentage of Pt recovered. | Net No. 1 31.0%<br>Net No. 2 9.7%<br>Net No. 3 7.9% | 66.2%.<br>10.1%.<br>3.2%. |

These tests clearly show the superiority of fine gold over the base metal alloy. Noble metals in general have been found superior to the base metals in their collecting action. Alloys of gold with silver or palladium as well as palladium silver alloys can be used with advantage. Pure silver is only sufficiently stable against thermal and chemical influences at lower temperatures. The excellent collecting effect of fine gold is, however, not quite reached by any other noble metal combination. In view of this, it has been found preferable to take steps that no diffusion takes place between the gold coating and the base metal of the netting. Such diffusion can be hindered by the insertion of a blocking layer of metallic or non-metallic character between the gold coating and the base metal core. Oxidic blocking layers have been found especially effective. Silver has also been found suitable as a metallic blocking layer, as silver does not alloy with iron and nickel or alloys of these metals especially their chromium alloys. In order to hinder diffusion between silver and gold, it has been found advisable to provide a further blocking layer between these two layers of a metal which neither forms mixed crystals with the gold nor the silver. Rhodium and iridium have been found suited for such a blocking layer.

Such a multilayer wire for nettings, in accordance with the invention, can have the following composition:

| | |
|---|---|
| Core | Nickel. |
| 1. Intermediate layer | Silver. |
| 2. Intermediate layer | Rhodium. |
| Surface coating | Gold. |

Nettings produced from pure gold can be employed in accordance with the invention, but they possess disadvantages over nettings in which a gold surface layer is provided over a base metal core. Aside from the considerable investment in gold required for pure gold netting, they possess an inferior stability at working temperatures of about 700° C. and above.

Nettings formed from gold coated wires having a base metal core of suitable heat and scaling resistant metals or metal alloys have excellent stability under working conditions. Aside from nickel cores, cores of the following alloys have been found very satisfactory.

| | I | II | III | IV |
|---|---|---|---|---|
| | Percent | Percent | Percent | Percent |
| nickel | 74.5 | 26 | 30 | 8 |
| chromium | 20.0 | 20 | | 18 |
| manganese | 3.5 | 2.0 | | |
| silicon | 1.5 | | | |
| thorium | 0.5 | | 0.5 | |
| iron | | 51 | 64.5 | 74 |
| aluminum | | | 5 | |

The desired metallic coatings can be produced upon these base metal cores by electrolysis or other known means. If an oxidic blocking layer is to be provided before the application of the metallic coating or coatings, such oxidic layer can be produced by annealing the uncoated base metal core in air. As such oxidic layer possesses poor conductivity, it is advisable to cover such layer first with a thin metallic layer, either by cathode sputtering, thermal evaporation in vacuum, or other means, such as, in the case of gold, by burning a so-called organic bright gold solution. The thin metallic layers thus formed then serve as an excellent base for electrolytic deposition of the desired metal coating or coatings in the desired thickness.

It was found that the thickness of the gold coating upon the nettings in accordance with the invention is of considerable importance. For example, a gold coating which is only 1 micron thick in comparison to the coating of 3 micron thickness employed in the above described Test II, possessed a considerably poorer recovery action for platinum as may be seen from the test below carried out with nettings of the same character as used in Test II, except that the gold coating was only 1 micron thick.

Test III

Percentage of Pt recovered: Percent

| | |
|---|---|
| Net No. 1 | 44.8 |
| Net No. 2 | 11.6 |
| Net No. 3 | 5.6 |

Nettings with thicker gold coatings can be used for longer periods before they are saturated. It has been found that nettings having a thick gold coating have an average useful life of about 180 days.

It was furtherfore found that when nettings, in accordance with the invention, are employed, a considerably lower quantity of gold is necessary for the recovery of a certain quantity of platinum than when gold plated Raschig rings are employed. In the case of Raschig rings, the quantity of gold used to the quantity of platinum recovered is between about 6:1 and 7:1, whereas in gold coated nettings, in accordance with the invention, the ratio is only between 2:1 to 3:1. Consequently, a considerable saving is effected in the amount of gold required.

A further substantial advantage of the netttings in accordance with the invention over the previously employed gold plated Raschig rings resides in the fact that it is not necessary to remove all of the nettings employed to recover the platinum therefrom. As the first netting behind the platinum catalyst collect 6 times the quantity of the platinum collected by the second netting and 20 the quantity collected by the third netting, it is only necessary to replace the first netting about every six months. Of course, it is also possible to insert the new netting in the position occupied by the third netting and respectively moving nettings two and three to positions 1 and 2, so that each of the nettings can become saturated with platinum.

The number of nettings employed can be increased above the three mentioned and the number to be employed is only limited by the flow resistance caused thereby as each additional netting increases the flow resistance. A series of six nettings, for example, has the advantage that the last three need not be replaced until after years of use.

The nettings, in accordance with the invention, can be inserted directly behind the platinum catalyst nettings preferably at a distance between 10 and 1,000 mm. Whether the collecting nettings are in contact with each other or spaced at a slight distance from each seems of little significance. It is, of course, necessary that such collecting nettings are located at a point in the stream of the gases leaving the platinum in which the temperature is still sufficiently high and before the platinum carried off by such gases has any substantial possibility to deposit on other parts of the apparatus.

It has been found advantageous to employ galloon weave nettings which are placed in staggered relationship with respect to each other.

In the accompanying drawings,

Fig. I diagrammatically shows a section of a catalytic reaction zone provided with platinum catalyst nettings and nettings for recovery of platinum lost by the platinum nettings.

Fig. II is an enlarged plan view of a galloon weave netting in accordance with the invention.

Fig. III is an enlarged section of a gold coated base metal wire provided with an intermediate oxidic blocking layer.

Fig. IV is an enlarged section of a gold coated base metal wire provided intermediate silver and iridium blocking layers.

Referring to the drawings, 1 is the catalytic reaction chamber provided with platinum catalyst nettings 2 and collecting nettings 3 which are arranged behind the platinum settings in the path of the heated reaction gases leaving the platinum catalyst to recover platinum lost by the platinum catalyst. The collecting netting 3 is of a galloon weave in which the weft wires 13 are interwoven with spaced warp wires 14, so as to have the weft wires contiguous. The warp and weft wires are preferably composed of a base metal heat resistant core 4, provided with an intermediate oxidic coating 5 and an outer coating 6 of gold, as shown in Fig. III, or of a base metal case 4 provided successively with a silver coating 7, an iridium coating 8, and an outer gold coating 6.

This application is a continuation-in-part of my application Ser. No. 141,700, filed February 1, 1950, now Patent No. 2,648,393 dated August 11, 1953.

I claim:

1. In an apparatus for carrying out high temperature catalytic reactions employing a platinum catalyst in which highly heated reaction gases leaving the catalyst contain platinum lost from the catalyst, means for collecting the platinum contained in the reaction gases leaving the platinum catalyst consisting of at least one fine meshed woven netting having a metallic surface comprising a noble metal selected from the group consisting of gold, silver and palladium arranged across the path of the highly heated reaction gases leaving the catalyst.

2. In an apparatus for carrying out high temperature catalytic reactions employing a platinum catalyst in which highly heated reaction gases leaving the catalyst contain platinum lost from the catalyst, means for collecting the platinum contained in the reaction gases leaving the platinum catalyst consisting of at least one fine meshed woven netting having a metallic surface comprising gold arranged across the path of the highly heated reaction gases leaving the catalyst.

3. In an apparatus for carrying out high temperature catalytic reactions employing a platinum catalyst in which highly heated reaction gases leaving the catalyst contain platinum lost from the catalyst, means for collecting the platinum contained in the reaction gases leaving the platinum catalyst consisting of at least one fine meshed metallic surfaced woven netting arranged across the path of the highly heated reaction gases leaving the catalyst, said netting being composed of wires having a heat and scaling resistant metal core and an exterior coating comprising gold.

4. An apparatus according to claim 3, in which an oxidic blocking layer is provided between the base metal core and the exterior coating comprising gold.

5. An apparatus according to claim 3, in which a silver coating is provided between the base metal core and the exterior coating comprising gold.

6. An apparatus according to claim 3, in which a silver coating is provided over the base metal core and a coating of a metal which does not form mixed crystals with silver and gold is provided between such silver coating and the exterior coating comprising gold.

7. An apparatus according to claim 2, in which such fine meshed metallic surfaced netting is of a galloon weave, the weft of which is closely packed.

8. In an apparatus for carrying out high temperature catalytic reactions employing a platinum catalyst in which highly heated reaction gases leaving the catalyst contain platinum lost from the catalyst, means for collecting the platinum contained in the reaction gases leaving the platinum catalyst consisting of a plurality of staggered fine meshed woven nettings having a metallic surface comprising a noble metal selected from the group consisting of gold, silver and palladium arranged across the path of the highly heated reaction gases leaving the catalyst.

9. An apparatus according to claim 8, in which such fine meshed metallic nettings are of a galloon weave, the weft of which is closely packed.

10. In an apparatus for carrying out high temperature catalytic reactions in which highly heated reaction gases leaving the catalyst contain platinum lost from such catalyst, at least one fine meshed netting having a metallic surface comprising a noble metal seelcted from the group consisting of gold, silver and palladium of galloon weave, the weft of which is closely packed arranged across the path of the highly heated gases leaving the catalyst, for collecting the platinum contained in the reaction gases leaving the catalyst, said netting being essentially only collecting means in such apparatus for the platinum contained in such gases.

References Cited in the file of this patent

UNITED STATES PATENTS

| | | |
|---|---|---|
| 1,382,975 | Haslup | June 28, 1921 |
| 2,226,113 | Chastain | Dec. 24, 1940 |
| 2,226,149 | Zimmerman | Dec. 24, 1940 |
| 2,615,699 | Dixon | Oct. 28, 1952 |